United States Patent
Wei et al.

(10) Patent No.: US 12,129,375 B2
(45) Date of Patent: Oct. 29, 2024

(54) POLYBUTYLENE TEREPHTHALATE COMPOSITION AND A COMPOSITE OF PLASTIC/METAL HYBRID

(71) Applicant: BASF SE, Ludwigshafen (DE)

(72) Inventors: Zhen Ke Wei, Shanghai (CN); Qiong Jie Han, Shanghai (CN); Chao Liu, Shanghai (CN); Roland Helmut Kraemer, Lemfoerde (DE); Dai Watanabe, Yokkaichi (JP); Zhenguo Liu, Alpharetta, NJ (US)

(73) Assignee: BASF SE, Ludwigshafen (DE)

( * ) Notice: Subject to any disclaimer, the term of this patent is extended or adjusted under 35 U.S.C. 154(b) by 256 days.

(21) Appl. No.: 17/767,128

(22) PCT Filed: Oct. 13, 2020

(86) PCT No.: PCT/EP2020/078772
§ 371 (c)(1),
(2) Date: Apr. 7, 2022

(87) PCT Pub. No.: WO2021/074146
PCT Pub. Date: Apr. 22, 2021

(65) Prior Publication Data
US 2022/0372275 A1 Nov. 24, 2022

(30) Foreign Application Priority Data
Oct. 16, 2019 (WO) ............... PCT/CN2019/111502

(51) Int. Cl.
*C08L 67/02* (2006.01)
(52) U.S. Cl.
CPC ........... *C08L 67/02* (2013.01); *C08L 2205/02* (2013.01); *C08L 2205/03* (2013.01)
(58) Field of Classification Search
CPC .......... C08L 67/02; C08L 51/04; C08L 25/04; C08L 23/0884; C08K 7/28; C08K 7/14
See application file for complete search history.

(56) References Cited

U.S. PATENT DOCUMENTS

| | | | |
|---|---|---|---|
| 2002/0077418 A1* | 6/2002 | Chen | A61M 25/1029 525/88 |
| 2009/0256370 A1* | 10/2009 | Siler | B60R 19/18 296/187.04 |
| 2013/0303660 A1* | 11/2013 | Kurouchi | C08L 67/025 524/409 |
| 2015/0102528 A1* | 4/2015 | Gunes | B29B 7/002 521/134 |
| 2015/0368458 A1 | 12/2015 | Sun et al. | |
| 2017/0029615 A1* | 2/2017 | He | C08K 3/013 |
| 2017/0240737 A1* | 8/2017 | Peterson | C08K 3/34 |

FOREIGN PATENT DOCUMENTS

| | | |
|---|---|---|
| CN | 101743111 A | 6/2010 |
| EP | 2480601 A1 | 8/2012 |
| EP | 2174766 B1 | 8/2013 |
| WO | WO-2019/130269 A1 | 7/2019 |

OTHER PUBLICATIONS

DuPont—Hytrel Product Reference Guide—no date—Feb. 23, 2024 (Year: 2024).*
DuPont™ Hytrel® 4056, Thermoplastic Polyester Elastomer, Product Information, 16 pp. (2017).
International Application No. PCT/EP2020/078772, International Search Report and Written Opinion, mailed Jan. 19, 2021.
"Hytrel 4056—Thermoplastic Copolyester Elastomer", Product Information—DuPont Performance Polymers, XP055760787, Jul. 5, 2017, 3 pages.

* cited by examiner

*Primary Examiner* — Mark S Kaucher
(74) *Attorney, Agent, or Firm* — Grüneberg and Myers PLLC

(57) ABSTRACT

The present invention relates to a polybutylene terephthalate composition, comprising as component (A) polybutylene terephthalate (PBT) resin, as component (B) polyester copolymer with melting point from 105° C. to 185° C., as component (C) vinyl-based polymer, and optionally as component (D) glass bubbles. The present invention also relates to a composite of plastic/metal hybrid, which comprises metal article and the polybutylene terephthalate composition of the present invention which is joined to and integrated with the metal article.

20 Claims, No Drawings

POLYBUTYLENE TEREPHTHALATE COMPOSITION AND A COMPOSITE OF PLASTIC/METAL HYBRID

CROSS-REFERENCE TO RELATED APPLICATIONS

This is the U.S. national phase of International Application No. PCT/EP2020/078772, filed Oct. 13, 2020, which claims the benefit of International Patent Application No. PCT/CN2019/111502, filed on Oct. 16, 2019.

FIELD OF THE INVENTION

The present invention relates to a polybutylene terephthalate composition, also relates to a composite of plastic/metal hybrid comprising the polybutylene terephthalate composition of the present invention.

DESCRIPTION OF THE RELATED ART

In the consumers electronics industry, metal is preferred used as the main housing and chassis material for portable electronic devices (such as cell phones, tablets and laptops) due to the functional benefits it provides in terms of both aesthetics and useful properties.

Thermoplastics can compensate the shortages of metal in radio transparency, color-ability, cost, etc. Metal/plastic hybrid solutions combine the benefits of metal and plastic. Metal/plastic hybrid is a composite piece made of plastic and metal parts with mechanical locking between the two components, produced through injection molding or extrusion, enables production of highly load-resistant and low-cost parts.

Metal-insert molding, in-mold adhesive and metallization are the traditional techniques for metal/plastic hybrid design. A mechanical-lock design is used in metal-insert molding to physically connects the plastic and metal parts. An adhesive agent is needed to improve the bond between the metal and plastics. Regarding to metallization, a thin layer of metal is applied as a coating on the plastic, creating a metallic appearance. Comparing with traditional techniques, nano-molding technology (NMT) has been the popular technology and shows obvious advantages of direct bonding of metal and plastic. Nano-molding technology was developed by Taisei Plas. This is done by reacting the metal surface to create nano- to micro-sized holes and then injecting mold the desired plastic components on the metal surface, creating a strong bond at the interface. The advantage of this method is the possibility to manufacture light and strong products. Various metals could be used in NMT, such as magnesium, aluminum, alloys of these materials, stainless steel and other iron alloys.

Plastic material used in NMT must be affinitive to metal and compatible with the NMT process. Crystalline polymer polyphenylene sulfide (PPS) and polybutylene terephthalate (PBT) resins have become popular plastic material in nano-molding technology, due to their inherently good chemical resistance and ability to be compounded with fillers.

Taisei Plas disclosed a metal/plastic hybrid composite in CN101743111A, wherein the metal is steel, the plastic is high stiffness crystalline resin compositions. The crystalline resin composition comprises 70-97 wt % of PBT, 3-30 wt % of PET and/or polyolefin resin. The bonding strength could reach 17 MPa in terms of 30 wt % glass fiber reinforced PBT blended with PET.

SUMMARY OF THE INVENTION AND ADVANTAGES

In view of the above prior art, the problem to be solved in the present invention is to provide a polybutylene terephthalate composition which succeeds in higher bonding strength and good dielectric property.

The object of the present invention is to provide a polybutylene terephthalate composition, comprising as component (A) polybutylene terephthalate (PBT) resin, as component (B) polyester copolymer with melting point from 105° C. to 185° C., as component (C) vinyl-based polymer, and optionally as component (D) glass bubbles.

The object underlying the present invention is also to provide an article obtained by the polybutylene terephthalate composition according to the present invention. The article is preferably used as parts or components in E&E field, especially in high frequency communication field, such as frame, housing or package of mobiles, sensors or laptops, or antenna splitter of mobiles or vehicles.

The object underlying the present invention is also to provide a process of the polybutylene terephthalate composition.

The object underlying the present invention is also to provide a use of the polyester copolymer with melting point ($T_m$) from 105° C. to 185° C. in increasing the bonding strength of polybutylene terephthalate resin and metal in a plastic/metal hybrid.

The object underlying the present invention is also to provide a composite of plastic/metal hybrid, which comprises metal article and the polybutylene terephthalate composition of the present invention which is joined to and integrated with the metal article.

In the invention, terms such as "a", "an" and "the" are not intended to refer to only a singular entity but include the general class of which a specific example may be used for illustration.

The terms "a", "an" and "the" are used interchangeable with the term "at least one". The phrases "at least one of" and "comprises at least one of" followed by a list refers to any one of the items in the list and any combination of two or more item in the list. All numerical ranges are inclusive of their endpoints and non-integral values between the endpoints unless otherwise stated.

The terms "first", "second" and "third" are used in this disclosure merely as a matter of convenience in the description of one or more of the embodiments. It will be understood that, unless otherwise noted, those terms are used in their relative sense only.

The term "glycol" is an aliphatic diol containing two hydroxyl groups (—OH groups) attached to different carbon atoms.

The term "metal" includes pure metal material and metal alloy which is composed of two or more elements at least one of which is a metal.

DETAILED DESCRIPTION OF THE INVENTION

Disclosed is one polybutylene terephthalate composition, comprising as component (A) polybutylene terephthalate (PBT) resin, as component (B) polyester copolymer with melting point from 105° C. to 185° C., as component (C) vinyl-based polymer, and optionally as component (D) glass bubbles.

Polybutylene Terephthalate Resin (A)

The polybutylene terephthalate composition according to the present invention contains a polybutylene terephthalate resin (A). The polybutylene terephthalate resin (A) includes a homo-polyester or co-polyester (a polybutylene terephthalate, a polybutylene terephthalate co-polyester). The polybutylene terephthalate resin contains a butylene terephthalate as a main component, which is obtainable by a common method, for example by the polycondensation of polymerization components comprising a first dicarboxylic acid component including at least one terephthalic acid and/or the ester derivative thereof and a first glycol component including at least one 1,4-butane diol and/or the ester derivative thereof.

Any known polybutylene terephthalate resin could be used in the present invention. The present invention is not limited in crystallization property, kind or amount of a terminal group of the polybutylene terephthalate, intrinsic viscosity, molecular weight, linear or branched structure, kind or amount of a polymerization catalyst, and a polymerization method.

The polybutylene terephthalate resin may contain polymerization components other than terephthalic acid or the ester derivative thereof, or 1,4-butane diol or the ester derivative thereof within the range not impairing the characteristics. For example, the other polymerization components are preferably in an amount of less than or equal to 40 mol %, particularly less than or equal to 20 mol %, based on the total polymerization components of the polybutylene terephthalate resin.

Examples of the other polymerization components include aliphatic dicarboxylic acids having up to 20 carbon atoms, cycloaliphatic dicarboxylic acids having 7 to 12 carbon atoms, and/or aromatic dicarboxylic acids having 8 to 16 carbon atoms, preferably is selected from the group consisting of succinic acid, glutaric acid, adipic acid, pimelic acid, suberic acid, sebacic acid, azelaic acid, undecanedicarboxylic acid, dodecanedicarboxylic acid, tridecanedioic acid, tetradecanedioic acid, pentadecanoic acid, hexadecanedicarboxylic acid, dimeric acid, isophthalic acid, phthalic acid, 2,6-naphthalene dicarboxylic acid, hexahydrophthalic acid, hexahydroisophthalic acid, hexahydroterephthalic acid, 1,2-cyclopentanedicarboxylic acid, 1,3-cyclopentanedicarboxylic acid, himic acid, 4,4'-diphenyldicarboxylic acid, 4,4'-diphenyletherdicarboxylic acid, 4,4'-diphenylmethanedicarboxylic acid and 4,4'-diphenylketonedicarboxylic acid, more preferably is succinic acid, glutaric acid, adipic acid, pimelic acid, sebacic acid, isophthalic acid and/or phthalic acid. These components may be used singly alone, or by mixing two or more kinds thereof.

Examples of the other polymerization components include aliphatic glycol having 2 to 12 carbon atoms, cycloaliphatic glycol having 6 to 12 carbon atoms, polyoxyalkylene glycol having a plurality of oxyalkylene units of which the carbon atom number is 2 to 4, and/or aromatic glycol having 6 to 14 carbon atoms, preferably is selected from the group consisting of ethylene glycol, propylene glycol, 1,3-butylene glycol, trimethylene glycol, 1,6-hexanediol, neopentanediol, 1,3-octanediol, diethylene glycol, triethylene glycol, dipropylene glycol, tripropylene glycol, ditetramethylene glycol, decanediol, 1,4-cyclohexanediol, 1,4-cyclohexanedimethanol, bis-1,4-(hydroxymethyl)cyclohexane, diethylene glycol, polytetramethylene glycol, bisphenols, xylylene glycol and naphthalene diol, more preferably is ethylene glycol and/or diethylene glycol. These components may be used singly alone, or by mixing two or more kinds thereof.

Examples of the polybutylene terephthalate resin include polybutylene terephthalate, polybutylene(terephthalate/isophthalate), polybutylene (terephthalate/adipate), polybutylene (terephthalate/sebacate), polybutylene (terephthalate/decane dicarboxylate), polybutylene (terephthalate/naphthalate) and poly(butylene/ethylene) terephthalate.

The polybutylene terephthalate composition preferably comprises 20 wt % to 80 wt % of the polybutylene terephthalate resin based on the total weight of the polybutylene terephthalate composition. For example, the polybutylene terephthalate resin disclosed herein may be in the range from 20 wt % to 70 wt %, 20 wt % to 60 wt %, 20 wt % to 50 wt %, or 20 wt % to 40 wt % based on the total weight of the polybutylene terephthalate composition.

The viscosity number of the polybutylene terephthalate resin is suitable in the range from 90 to 170 cm$^3$/g, preferably from 100 to 135 cm$^3$/g, more preferably from 100 to 120 cm$^3$/g, measured in a 0.005 g/ml phenol/1,2-dichlorobenzene solution (1:1 mass ratio), according to ISO 1628-5.

In one embodiment of the invention, the polybutylene terephthalate resin is linear polybutylene terephthalate resin.

Low Melting Point Polyester (B)

The polyester copolymer with melting point ($T_m$) from 105° C. to 185° C. in the invention (hereinafter, simply referred to as "the polyester copolymer") is also called as "low melting point polyester", which has lower melting point than the unmodified polyester. The melting point is measured by differential scanning calorimetry ("DSC") according to ISO11357 with a heating rate of 10° C./min. The polyester copolymer can be obtainable by partial substitution of a second dicarboxylic acid component and/or a second glycol component constituting polyethylene terephthalate and/or polybutylene terephthalate with a copolymerizable monomer, in which the second dicarboxylic acid component comprising at least a terephthalic acid and/or the ester derivative thereof; the second glycol component comprising at least one 1,4-butane diol, ethylene glycol and/or the ester derivative of 1,4-butane diol and ethylene glycol, preferably is ethylene glycol and/or the ester derivative thereof.

The polyester copolymer is preferably obtainable by partial substitution of terephthalic acid and/or ethylene glycol constituting polyethylene terephthalate with the copolymerizable monomer.

The copolymerizable monomer includes one or more monomers selected from a third dicarboxylic acid excluding terephthalic acid, and/or a third glycol excluding ethylene glycol and 1,4-butane diol.

In the polyester copolymer (B), the mole ratio of dicarboxylic acid (the second dicarboxylic acid and the third carboxylic acid) to the glycol (the second glycol and the third glycol) is preferably from 0.9:1.1 to 1.1:0.9.

The third dicarboxylic acid could be at least one selected from the group consisting of an aliphatic dicarboxylic acid, a cycloaliphatic dicarboxylic acid, and/or an aromatic dicarboxylic acid excluding terephthalic acid.

The aliphatic dicarboxylic acid disclosed herein preferably comprises from 4 to 40 carbon atoms, more preferably from 4 to 24 carbon atoms, from 4 to 14 carbon atoms, or from 4 to 10 carbon atoms. For example, the aliphatic dicarboxylic acid disclosed herein could be succinic acid, glutaric acid, adipic acid, pimelic acid, suberic acid, azelaic acid, sebacic acid, undecane dicarboxylic acid, dodecane dicarboxylic acid, tridecane dicarboxylic acid, tetradecane dicarboxylic acid, pentadecane dicarboxylic and/or hexadecane dicarboxylic acid, preferably is succinic acid, glutaric acid, azelaic acid, adipic acid, pimelic acid and/or sebacic acid.

The cycloaliphatic dicarboxylic acid preferably comprises from 7 to 12 carbon atoms. For example, the cycloaliphatic dicarboxylic acid disclosed herein could be hexahydrophthalic acid, hexahydroisophthalic acid, hexahydroterephthalic acid, 1,2-cyclopentanedicarboxylic acid, 1,3-cyclopentanedicarboxylic acid and/or himic acid.

The aromatic dicarboxylic acid excluding terephthalic acid preferably comprises from 8 to 16 carbon atoms, more preferably is at least one selected from the group consisting of isophthalic acid, phthalic acid, 2,6-naphthalenedicarboxylic acid, 1,4-naphthalenedicarboxylic acid, 2,7-naphthalenedicarboxylic acid, 4,4'-diphenylmethanedicarboxylic acid, 4,4'-diphenylketone dicarboxylic acid, 4,4'-diphenyldicarboxylic acid, 4,4'-diphenoxy ether dicarboxylic acid, and 4,4'-diphenyl ether dicarboxylic acid, preferably is isophthalic acid and/or phthalic acid.

The derivative of the second dicarboxylic acid is preferably a $C_1$-$C_4$ alkyl ester of phthalic acid or isophthalic acid, such as dimethyl phthalate or dimethyl isophthalate (DMI).

The third glycol could be at least one selected from the group consisting of an aliphatic alkane diol excluding ethylene glycol or 1,4-butane diol, polyoxyalkylene glycol, a cycloaliphatic diol, and an aromatic diol.

The aliphatic alkane diol disclosed herein preferably aliphatic alkane diol comprises from 2 to 12, more preferably from 2 to 10, further more preferably from 2 to 6 carbon atoms, for example, trimethylene glycol, propylene glycol, neopentyl glycol, hexane diol, octane diol and/or decane diol.

The polyoxyalkylene glycol disclosed herein preferably comprises a plurality of oxyalkylene units of which the carbon atom number is 2 to 4, more preferably is at least one selected from the group consisting of diethylene glycol, dipropylene glycol, ditetramethylene glycol, triethylene glycol, tripropylene glycol, and polytetramethylene glycol.

The cycloaliphatic diol disclosed herein preferably comprises from 6 to 12 carbon atoms, more preferably is 1,4-cyclohexanediol and/or 1,4-cyclohexane dimethanol.

The aromatic diol disclosed herein preferably comprises from 6 to 14 carbon atoms, more preferably is at least one selected from the group consisting of xylylene glycol, hydroquinone, resorcinol, naphthalene diol, biphenol, bisphenol and xylilene glycol.

In the preferred embodiment of the invention, the third glycol is aliphatic alkane diol having from 2 to 6 carbon atoms such as trimethylene glycol, propylene glycol and/or hexane diol, and/or polyoxyalkylene glycol having an oxyalkylene unit at a repeat number of about 2 to 4 such as diethylene glycol.

In the preferred embodiment of the invention, the third dicarboxylic acid is aliphatic dicarboxylic acid having 6 to 12 carbon atoms such as adipic acid, pimelic acid, suberic acid, azelaic acid and/or sebacic acid, and/or aromatic dicarboxylic acid such as isophthalic acid and/or phthalic acid.

In the preferred embodiment of the invention, the third glycol could be the polyoxyalkylene glycol having an oxyalkylene unit at a repeat number of about 2 to 4 such as diethylene glycol, and the third dicarboxylic acid could be aromatic dicarboxylic acid such as isophthalic acid and/or phthalic acid.

In one preferred embodiment, the polyester copolymer could comprise 5% to 30%, preferably 5% to 20% by mole of copolymerizable monomers, based on the total moles of the monomers constituting the polyester copolymer.

In one preferred embodiment, the polyester copolymer comprises 1% to 10% by mole of the third glycol such as the polyoxyalkylene glycol and 4% to 29% by mole of the third dicarboxylic acid such as aromatic dicarboxylic acid, especially isophthalic acid and/or phthalic acid, based on the total moles of the monomers constituting the polyester copolymer.

In one preferred embodiment, the polyester copolymer is constituted from terephthalic acid, ethylene glycol, polyoxyalkylene glycol having 2 to 4 oxyalkylene units of which the carbon atom number is 2 to 4 such as diethylene glycol as the third glycol, and aromatic dicarboxylic acid having from 8 to 16 carbon atoms such as isophthalic acid and/or phthalic acid as the third carboxylic acid. Preferably, the amount of the third glycol is from 1 mol % to 10 mol %, the amount of the third dicarboxylic acid is from 4 mol % to 29 mol %, based on the total moles of the monomers constituting the polyester copolymer, the mole ratio of dicarboxylic acid (terephthalic acid and the third carboxylic acid) to the glycol (ethylene glycol and the third glycol) is 0.9:1.1 to 1.1:0.9.

The polybutylene terephthalate composition preferably comprises 5 wt % to 40 wt % of the polyester copolymer based on the total weight of polybutylene terephthalate composition. For example, the polyester copolymer disclosed herein may be in the range from 10 wt % to 35 wt %, 10 wt % to 30 wt %, 15 wt % to 35 wt %, or 15 wt % to 30 wt % based on the total weight of the polybutylene terephthalate composition.

The low melting point polyester preferably has a weight-average molecular weight of 8,000 to 80,000 g/mol, preferably from 10,000 to 30,000 g/mol, measured by means of as determined by gel permeation chromatography.

Vinyl-Based Polymer (C)

The polybutylene terephthalate composition of the present invention comprises (C) vinyl-based polymer which is derived from (C-1) at least one vinyl monomer, and (C-2) at least one ethylenically unsaturated carboxylic acid and/or a derivative thereof. The vinyl monomer is the monomer contains at least one carbon-carbon double bonds.

The vinyl monomer (C-1) is preferably alpha-olefin and/or diene, more preferably is alpha-olefin. The alpha-olefin preferably has from 2 to 20 carbon atoms, more preferably has from 4 to 10 carbon atoms. Examples of the alpha-olefin are ethylene, propylene, 1-butylene, isobutene, 1-pentene, 1-hexene, 1-octene, 4-methyl-1-pentene, 3-methyl-1-pentene, 3,5,5-trimethyl-1-hexene, 1-decene and mixture thereof, more preferably is ethylene, propylene, 1-butene, 1-hexene, isobutene, mixture of ethylene and propylene, mixture of ethylene and 1-octene, mixture of ethylene and 1-butene, mixture of propylene and 4-methyl-1-pentene, mixture of propylene and 1-butene, mixture of ethylene, propylene and 1-butene, and mixture of 1-decene and 1-methyl-1-pentene, most preferably is ethylene, 1-butene, 1-propylene, 1-pentene, and mixture of ethylene and 1-octene.

The diene is preferably conjugated diene, more preferably is 1,3-butadiene, 1,3-pentadiene, isoprene, 1,3-hexadiene and mixtures thereof, more preferably is 1,3-butadiene, 1,3-pentadiene and/or isoprene, most preferably is 1,3-butadiene.

The derivative of the ethylenically unsaturated carboxylic acid in the present invention is preferably selected from epoxy compound, ester, amide, imide, acid anhydride and/or metal salt of the ethylenically unsaturated carboxylic acid, more preferably is ester, epoxy compound and/or acid anhydride of the ethylenically unsaturated carboxylic acid.

In the vinyl-based polymer, the vinyl monomer (C-1) is preferably in an amount of from 40 wt % to 90 wt %, and preferably from 50 wt % to 85 wt %, and the ethylenically unsaturated carboxylic acid and/or a derivative thereof (C-2) is preferably in an amount of from 10 wt % to 60 wt %, and preferably from 15 wt % to 50 wt %, based on the total monomers constituting the vinyl-based polymer.

In one preferred embodiment, the component (C) is the combination of at least two vinyl-based polymers which are derived from at least one (C-1) and at least one (C-2), the (C-2) of one first vinyl-based polymer is derived from the monomers comprising at least one epoxy compound of the ethylenically unsaturated carboxylic acid, the (C-2) of one second vinyl-based polymer is derived from the monomers comprising at least one acid anhydride of the ethylenically unsaturated carboxylic acid. The (C-1) of the first and second vinyl-based polymers could be the same or different.

The mass ratio of the first vinyl-based polymer to the second vinyl-based polymer is preferably from 80:20 to 20:80, more preferably is from 70:30 to 30:70, most preferably is from 60:40 to 40:60.

In one preferred embodiment, the epoxy compound of the ethylenically unsaturated carboxylic acid in the first vinyl-based polymer is in an amount of from 1 wt % to 10 wt %, preferably from 2 wt % to 8 wt %, based on the total monomers constituting the first vinyl-based polymer. The acid anhydride of the ethylenically unsaturated carboxylic acid in the second vinyl-based polymer is in an amount of from 1 wt % to 10 wt %, preferably from 2 wt % to 8 wt %, based on the total monomers constituting the second vinyl-based polymer.

In one preferred embodiment, the component (C) is the combination of the first vinyl-based polymer and the second vinyl-based polymer, the (C-1) of the first and second vinyl-based monomer is independently selected from ethylene, 1-butene, 1-propylene, 1-pentene, and mixture of ethylene and 1-octene, preferably from ethylene, 1-propylene and mixture of ethylene and 1-octene;

the (C-2) of the first vinyl-based monomer comprises glycidyl acrylate and/or glycidyl methacrylate, and optionally comprises other ethylenically unsaturated carboxylic acid and/or the derivative thereof excluding glycidyl acrylate and/or glycidyl methacrylate, preferably is the ethylenically unsaturated carboxylic acid and/or the ester of the ethylenically unsaturated carboxylic acid; the glycidyl acrylate and/or glycidyl methacrylate is preferably in an amount of from 1 wt % to 10 wt %, more preferably from 2 wt % to 8 wt %, based on the total monomers constituting the first vinyl-based polymer;

the (C-2) of the second vinyl-based monomer comprises (meth)acrylic anhydride and/or fumaric anhydride, and optionally comprises other ethylenically unsaturated carboxylic acid and/or the derivative thereof excluding (meth) acrylic anhydride and/or fumaric anhydride, preferably is the ethylenically unsaturated carboxylic acid and/or the ester of the ethylenically unsaturated carboxylic acid; the (meth) acrylic anhydride and/or fumaric anhydride is preferably in an amount of from 1 wt % to 10 wt %, more preferably from 2 wt % to 8 wt %, based on the total monomers constituting the second vinyl-based polymer.

The ethylenically unsaturated carboxylic acid has at least one carbon-carbon double bond and at least one carboxyl group. Examples of the ethylenically unsaturated carboxylic acid is mono-olefinic acid and polyolefinic unsaturated mono-, and poly-carboxylic acid (di-, tri-carboxylic acid), preferably is acrylic acid, methacrylic acid, maleic acid, fumaric acid, glutaconic acid, itaconic acid, citraconic acid, 2-ethylacrylic acid, 2-chloroacrylic acid, crotonic acid, isocrotonic acid, angelic acid, sorbic acid, mesaconic acid, cinnamic acid, p-chloro cinnamic acid, 3,4,5,6-tetrahydrophthalic acid, 1,2,3,6-tetrahydrophthalic acid, bicyclo (2.2.2)-octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo (2.2.1) octa-7-ene-2,3,5,6-tetracarboxylic acid, maleopimaric acid and 7-oxabicyclo (2.2.1) hepta-5-ene-2,3-dicarboxylic acid, more preferably is acrylic acid, methacrylic acid, maleic acid, fumaric and/or citraconic acid.

The acid anhydride of the ethylenically unsaturated carboxylic acid is preferably selected from the group consisting of maleic anhydride (MAH), acrylic anhydride, methacrylic anhydride, 4-methyl cyclohex-4-ene-1,2-dicarboxylic acid anhydride, itaconic anhydride, citraconic anhydride, fumaric anhydride, 3,4,5,6-tetrahydrophthalic anhydride, 1,2,3,6-tetrahydrophthalic anhydride, bicyclo(2.2.2)oct-5-ene-2,3-dicarboxylic acid anhydride, 1,2,3,4,5,8,9,10-octahydronaphthalene-2,3-dicarboxylic acid anhydride, bicyclo(2.2.1)hept-5-ene-2,3-dicarboxylic acid anhydride, tnorborn-5-ene-2,3-dicarboxylic acid anhydride, nadic anhydride, methyl nadic anhydride, himic anhydride, methyl himic anhydride and x-methylbicyclo(2.2.1)hept-5-ene-2,3-dicarboxylic acid anhydride (XMNA), more preferably is maleic anhydride, (meth)acrylic anhydride and/or fumaric anhydride.

The ester of the ethylenically unsaturated carboxylic acid is preferably the ester of acrylic acid and/or acetic acid, more preferably is an alkyl ester and/or a hydroxy alkyl ester of acrylic acid and/or acetic acid, such as $C_1$-$C_{18}$, more preferably $C_1$-$C_{12}$, most preferably $C_1$-$C_4$ alkyl ester and/or $C_1$-$C_{18}$, more preferably $C_1$-$C_{12}$, most preferably $C_1$-$C_4$ hydroxy alkyl ester of acrylic acid and/or acetic acid. Examples of the ester of the ethylenically unsaturated carboxylic acid are methyl methacrylate, methyl acrylate, ethyl methacrylate, ethyl acrylate, propyl acrylate, propyl methacrylate, butyl acrylate, butyl methacrylate, isobutyl acrylate, isobutyl methacrylate, 2-ethylhexyl acrylate, octyl acrylate, octyl methacrylate, decyl acrylate, decyl methacrylate, isodecyl acrylate, isodecyl methacrylate, lauryl acrylate, lauryl methacrylate, dimethyl maleate, monomethyl maleate, hydroxyethyl methacrylate (HEMA), stearyl methacrylate, stearyl acrylate, isobornyl acrylate, isobornyl methacrylate, hydroxypropyl methacrylate and vinyl acetate; more preferably is methyl methacrylate, methyl acrylate, ethyl methacrylate, ethyl acrylate, propyl acrylate, propyl methacrylate, butyl acrylate, butyl methacrylate, isobutyl acrylate, and/or isobutyl methacrylate, most preferably is methyl methacrylate, methyl acrylate, butyl acrylate and/or butyl methacrylate.

The epoxy compound of the ethylenically unsaturated carboxylic acid could be carboxylic acid glycidyl ester, glycidyl ether, and/or the like. Examples of the epoxy compound of the ethylenically unsaturated acid are glycidyl acrylate, glycidyl methacrylate, maleic acid 1-glycidyl ester, diglycidyl ester of maleic acid, monoglycidyl ester of itaconic acid, diglycidyl ester of itaconic acid, monoglycidyl ester of citraconic acid, diglycidyl ester of citraconic acid, monoglycidyl ester of butenetricarboxylic acid, diglycidyl ester of butenetricarboxylic acid, triglycidyl ester of butenetricarboxylic acid, vinyl glycidyl ether, allyl glycidyl ether, 2-methylallyl glycidyl ether, phenyl glycidyl ether, and 4-vinylbenzyl glycidyl ether, preferably is glycidyl acrylate and/or glycidyl methacrylate.

The amide of the ethylenically unsaturated carboxylic acid is preferably selected from the group consisting of allylamine, aminoethyl methacrylate, aminopropyl methacrylate, dimethyaminoethyl methacrylate, acrylamide, methacrylamide, maleic acid monoamide, maleic acid diamide, maleic acid N-monoethylamide, maleic acid N,N-diethylamide, fumaric acid monoamide, and fumaric acid diamide.

The imide of the ethylenically unsaturated carboxylic acid is preferably selected from the group consisting of maleimide, N-butylmaleimide, N-phenylmaleimide and N-cyclohexylmaleimide.

The melt salt of the ethylenically unsaturated carboxylic acid is preferably selected from the group consisting of sodium acrylate, calcium acrylate, sodium methacrylate and calcium methacrylate.

In one preferred embodiment, the derivative of the ethylenically unsaturated carboxylic acid is maleic anhydride, methyl methacrylate, hydroxyethyl methacrylate, hydroxypropyl methacrylate, glycidyl methacrylate or any combinations thereof.

In one preferred embodiment of the present invention, the vinyl-based polymer could be the block, alternating, random or grafted copolymers of at least one of (C-1) and at least one of (C-2), more preferably is the block and/or grafted copolymers of at least one of (C-1) and at least one of (C-2).

In one preferred embodiment of the present invention, the vinyl-based polymer derived from (C-1) which comprises the monomers selected from the group consisting of ethylene, propylene and octene, and (C-2) which comprises the monomers selected from the group consisting of maleic anhydride, methyl methacrylate, butyl (meth)acrylate, glycidyl methacrylate and ethyl (meth)acrylate.

The vinyl-based polymer is not limited in the linear, branched and core-shell structure, kind or amount of a polymerization catalyst, and a polymerization method.

Various known methods can be adopted for polymerizing an olefin with an unsaturated carboxylic acid or a derivative thereof. For example, there can be adopted a method in which the unsaturated carboxylic acid or the derivative thereof is added to a polyolefin portion which is polymerized by the olefin monomers to effect graft or block copolymerization, and a method in which the unsaturated carboxylic acid or the derivative thereof dissolved in a solvent is added to the polyolefin portion to effect graft or block copolymerization.

In one preferred embodiment, the vinyl-based polymer is selected from the group consisting of the block copolymers of ethylene/methyl (meth)acrylate, ethylene/(meth)acrylate, ethylene/ethyl (meth)acrylate, ethyl/butyl (meth)acrylate, propylene/methyl (meth)acrylate, propylene/(meth)acrylate, propylene/ethyl (meth)acrylate, propylene/butyl (meth)acrylate, ethylene/octene/methyl (meth)acrylate, ethylene/octene/(meth)acrylate, ethylene/octene/ethyl (meth)acrylate, ethylene/octene/butyl (meth)acrylate, ethylene/maleic anhydride, propylene/maleic anhydride, ethylene/octene/maleic anhydride, ethylene/methyl (meth)acrylate/maleic anhydride, ethylene/(meth)acrylate/maleic anhydride, ethylene/ethyl (meth)acrylate/maleic anhydride, ethylene/butyl (meth)acrylate/maleic anhydride, ethylene/glycidyl methacrylate, propylene/glycidyl methacrylate, ethylene/octene/glycidyl methacrylate, ethylene/methyl (meth)acrylate/glycidyl methacrylate, ethylene/(meth)acrylate/glycidyl methacrylate, ethylene/ethyl (meth)acrylate/glycidyl methacrylate, and ethylene/butyl (meth)acrylate/glycidyl methacrylate.

In one preferred embodiment, the vinyl-based polymer is the grafted copolymer, more preferably is glycidyl methacrylate grafted copolymer and/or maleic anhydride grafted copolymer, such as glycidyl methacrylate grafted polyethylene, glycidyl methacrylate grafted polypropylene, glycidyl methacrylate grafted polyoctene, glycidyl methacrylate grafted poly(ethylene/octene), glycidyl methacrylate grafted poly(ethylene/methyl (meth)acrylate), glycidyl methacrylate grafted poly(ethylene/(meth)acrylate), glycidyl methacrylate grafted poly(ethylene/ethyl (meth)acrylate), glycidyl methacrylate grafted poly(ethylene/butyl (meth)acrylate), maleic anhydride grafted polyethylene, maleic anhydride grafted polypropylene, maleic anhydride grafted polyoctene, maleic anhydride grafted poly(ethylene/octene), maleic anhydride grafted poly(ethylene/methyl (meth)acrylate), maleic anhydride grafted poly(ethylene/(meth)acrylate), maleic anhydride grafted poly(ethylene/ethyl (meth)acrylate), maleic anhydride grafted poly(ethylene/butyl (meth)acrylate).

In one preferred embodiment, the component (C) is the combination of the first vinyl-based polymer and the second vinyl-based polymer, the first vinyl-based polymer is the block or grafted copolymer derived from the monomers comprising at least one vinyl monomer (C-1) and at least one glycidyl acrylate and/or glycidyl methacrylate; the second vinyl-based polymer is the block or grafted copolymer derived from the monomers comprising at least one vinyl monomer (C-1) and at least one (meth)acrylic anhydride and/or fumaric anhydride; the first and/or second vinyl-based polymer optionally comprises at least one monomers selected from the group consisting of acrylic acid, methacrylic acid, maleic acid, fumaric, citraconic acid, methyl methacrylate, methyl acrylate, ethyl methacrylate, ethyl acrylate, propyl acrylate, propyl methacrylate, butyl acrylate, butyl methacrylate, isobutyl acrylate and/or isobutyl methacrylate, preferably consisting of methyl methacrylate, methyl acrylate, acrylic acid, methacrylic acid and maleic acid, more preferably consisting of methyl methacrylate, methyl acrylate, butyl acrylate and/or butyl methacrylate. The vinyl monomer (C-1) of the first and the second vinyl-based polymer could be the same or different, preferably is ethylene, -propylene, and mixture of ethylene and 1-octene. The mass ratio of the first vinyl-based polymer to the second vinyl-based polymer is preferably from 80:20 to 20:80, more preferably is from 70:30 to 30:70, most preferably is from 60:40 to 40:60.

In one preferred embodiment, the component (C) is the combination of the first and the second vinyl-based polymer; wherein the first vinyl-based polymer is selected from the group consisting of ethylene/glycidyl methacrylate copolymer, propylene/glycidyl methacrylate copolymer, ethylene/octene/glycidyl methacrylate copolymer, ethylene/ester of acrylic acid/glycidyl methacrylate copolymer, glycidyl methacrylate grafted polyethylene, glycidyl methacrylate grafted polypropylene, glycidyl methacrylate grafted polyoctene, glycidyl methacrylate grafted poly(ethylene/octene) and glycidyl methacrylate grafted poly(ethylene/ester pf acrylic acid); preferably is ethylene/ester of acrylic acid/glycidyl methacrylate copolymer and/or glycidyl methacrylate grafted poly(ethylene/ester of acrylic acid);

wherein the second vinyl-based polymer is selected from the group consisting of ethylene/maleic anhydride copolymer, propylene/maleic anhydride copolymer, ethylene/octene/maleic anhydride copolymer, ethylene/ester of acrylic acid/maleic anhydride copolymer, maleic anhydride grafted polyethylene, maleic anhydride grafted polypropylene, maleic anhydride grafted polyoctene, maleic anhydride grafted poly (ethylene/octene) and maleic anhydride grafted poly(ethylene/ester of acrylic acid), preferably is ethylene/ester of acrylic acid/maleic anhydride copolymer and/or maleic anhydride grafted poly(ethylene/ester of acrylic acid); wherein the ester of acrylic acid is preferably methyl (meth) acrylate, (meth)acrylate, ethyl (meth)acrylate, and/or butyl (meth)acrylate.

In one preferred embodiment, the component (C) is the combination of the first and the second vinyl-based polymer; the first vinyl-based polymer is ethylene/methyl (meth) acrylate/glycidyl methacrylate copolymer, ethylene/(meth) acrylate/glycidyl methacrylate copolymer, ethylene/ethyl (meth)acrylate/glycidyl methacrylate copolymer and/or ethylene/butyl (meth)acrylate/glycidyl methacrylate copolymer; the second vinyl-based polymer is ethylene/methyl (meth)acrylate/maleic anhydride copolymer, ethylene/(meth)acrylate/glycidyl methacrylate copolymer, ethylene/ethyl (meth)acrylate/glycidyl methacrylate copolymer, and/or ethylene/butyl (meth)acrylate/glycidyl methacrylate copolymer.

The vinyl-based polymer in the present invention is preferably in an amount of 0.1 wt % to 20 wt % by the weight of the polybutylene terephthalate composition. The amount of the vinyl-based polymer may be in the range from 0.1 wt % to 18 wt %, 0.1 wt % to 15 wt %, 0.1 wt % to 12 wt %, 0.1 wt % to 10 wt %, 0.5 wt % to 20 wt %, 0.5 wt % to 18 wt %, 0.5 wt % to 15 wt %, 0.5 wt % to 12 wt %, 0.5 wt % to 10 wt %, 1 wt % to 20 wt %, 1 wt % to 18 wt %, 1 wt % to 15 wt %, 1 wt % to 12 wt %, 1 wt % to 10 wt %, 2 wt % to 20 wt %, 2 wt % to 18 wt %, 2 wt % to 15 wt %, 2 wt % to 12 wt %, 2 wt % to 10 wt %, 5 wt % to 20 wt %, 5 wt % to 18 wt %, 5 wt % to 15 wt %, 5 wt % to 12 wt %, 5 wt % to 10 wt %, by the weight of the polybutylene terephthalate composition.

Glass Bubbles (D)

The glass bubbles in the invention is also called as "hollow glass bubbles", "hollow glass microspheres", "hollow glass beads", "glass microbubbles" or "glass balloons", having an average diameter of less than about 500 micrometers, and comprising a hollow part and a glass shell surrounding the hollow part. The hollow part could be filled with gas, such as air.

The average diameter is preferably median diameter $D_{50}$ by volume. The median diameter $D_{50}$ by volume of the hollow glass bubbles is preferably ranging from 5 to 50 microns.

The average true density of the glass bubbles in the invention is preferably 0.3-0.7 g/cc, more preferably is 0.3-0.6 g/cc. For example, the average true density of the glass bubbles disclosed herein may be in the range from 0.32 g/cc to 0.6 g/cc, 0.35 g/cc to 0.6 g/cc, 0.38 g/cc to 0.6 g/cc, 0.43 g/cc to 0.6 g/cc, 0.45 g/cc to 0.6 g/cc, 0.46 g/cc to 0.6 g/cc, 0.49 g/cc to 0.6 g/cc, 0.30 g/cc to 0.55 g/cc, 0.32 g/cc to 0.55 g/cc, 0.35 g/cc to 0.55 g/cc, 0.38 g/cc to 0.55 g/cc, 0.43 g/cc to 0.55 g/cc, 0.45 g/cc to 0.55 g/cc, 0.46 g/cc to 0.55 g/cc, 0.49 g/cc to 0.55 g/cc, 0.30 g/cc to 0.5 g/cc, 0.32 g/cc to 0.5 g/cc, 0.35 g/cc to 0.5 g/cc, 0.38 g/cc to 0.5 g/cc, 0.40 g/cc to 0.5 g/cc, 0.43 g/cc to 0.5 g/cc, 0.45 g/cc to 0.5 g/cc, 0.46 g/cc to 0.5 g/cc, 0.43 g/cc to 0.49 g/cc. The average true density of the glass bubbles is the quotient obtained by dividing the mass of a sample of glass bubbles by the true volume of that mass of glass bubbles as measured by a gas pycnometer. The "true volume" is the aggregate total volume of the glass bubbles, not bulk volume. The average true density can be measured using a pycnometer according to ASTM D2840-69 "Average True Particle Density of Hollow Microspheres". "g/cc" means grams per cubic centimeter.

The crush strength of the glass bubbles is preferably 5,000 PSI to 30,000 PSI, more preferably is 6,000 PSI to 28,000 PSI. For example, the crush strength disclosed herein may be in the range from 8,000 PSI to 20,000 PSI, 10,000 PSI to 18,000 PSI, 16,000 PSI to 18,000 PSI. The crush strength of the glass bubbles is typically measured using ASTM D3102-72 "Hydrostatic Collapse Strength of Hollow Glass Microspheres".

The glass bubbles according to the present invention has a size distribution comprising a median size by volume in a range from about 8 micrometers to about 60 micrometers. The median size by volume of the glass bubbles may be, for example, in a range from 10 to 55 micrometers, 15 to 55 micrometers, 15 to 50 micrometers, 15 to 45 micrometers, 15 to 40 micrometers, 15 to 35 micrometers, 15 to 30 micrometers, 15 to 25 micrometers, 15 to 20 micrometers, 20 to 55 micrometers, 20 to 50 micrometers, 20 to 45 micrometers, 20 to 40 micrometers, 20 to 35 micrometers, 20 to 30 micrometers, 20 to 25 micrometers. In some embodiments, the glass bubbles disclosed herein have a size distributed from 5 to 30 micrometers, 10 to 35 micrometers, 10 to 50 micrometers, 15 to 60 micrometers, 20 to 38 micrometers, 20 to 45 micrometers, 20 to 70 micrometers. The median size by volume is also called the Dv50 size, wherein 50 percent by volume of the glass bubbles in the distribution are smaller than the indicated size. As used herein, the term size is considered to be equivalent with the diameter and/or height of the glass bubbles. The size distribution of glass bubbles may be Gaussian, normal, non-normal distributions. The non-normal distributions may be unimodal or multi-modal.

The glass bubbles useful in the invention herein can be obtained commercially and marketed by Potters Industries, Valley Forge, PA 19482 under the trade designations "Spherical Hollow Glass Spheres" (for example grades 110P8 and 60P18) or by 3M company under the trade designation "3M Glass bubbles", for example grades S60, S60HS, S38HS, S38XHS, iM16K, iM30K, K42HS, and K46.

The polybutylene terephthalate composition preferably comprises 0 wt % to 30 wt % of glass bubbles based on the total weight of polybutylene terephthalate composition. For example, the glass bubbles disclosed herein may be in the range from 5 wt % to 25 wt %, 5 wt % to 20 wt %, 5 wt % to 15 wt %, 5 wt % to 10 wt %, based on the total weight of the polybutylene terephthalate composition.

The glass bubbles are preferably surface treated ones to improve the surface adhesive. The adhesive is for example silane coupling agents, urethane, epoxide, and/or amino-silane acid copolymers, more preferably is silane coupling agents.

The examples of the silane coupling agent is epoxy functional silane, urethane functional silane and/or amino ureide functional silane, preferable is at least one selected from the group consisting of epoxycyclohexyl functional silane, glycidoxy functional silane, isocyanate functional silane and amino ureide functional silane, most preferably is at least one selected from 2-(3,4-epoxycyclohexyl) ethyltrimethoxysilane, 3-glycidoxypropyl methyldimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyldimethoxysilane, N-2-(aminoethyl)-3-aminopropyltributoxysilane, N-2-(aminoethyl)-3-aminopropylmethyldiethoxysilane, N-2-(aminoethyl)-3-aminopropyltriethoxysilane, 3-aminopropyltrimethoxysilane, 3-aminopropylmethyldiethoxysilane, 3-aminopropylmethyldimethoxysilane, 3-aminopropyldimethylmethoxysilane, 3-aminopropyldimethylethoxysilane, 3-aminopropyltriethoxysilane, 3-triethoxysilyl-N-(1,3 dimethyl-butylidene) propylamine, N-phenyl-3-aminopropyltrimethoxysilane, N-(vinylbenzyl)-2-aminoethyl-3-aminopropyltrimethoxysilane hydrochloride, 3-ureidopropyltrialkoxysilane and 3-isocyanatepropyltriethoxysilane.

Reinforcing Agent (E)

The polybutylene terephthalate composition of the present invention may further comprise as component (E) reinforcing agent.

There is no limitation of the reinforcing agent (E) in the present invention, preferable is fibrous reinforcing agent. Examples of the reinforcing agents are glass fibers, carbon fibers, boron fibers, asbestos fibers, polyvinyl alcohol fibers, polyester fibers, acrylic fibers, wholly aromatic polyamide fibers, polybenzoxazole fibers, polytetrafluoroethylene fibers, kenaf fibers, bamboo fibers, hemp fibers, bagasse fibers, high strength polyethylene fibers, alumina fibers, silicon carbide fibers, potassium titanate fibers, brass fibers, stainless steel fibers, steel fibers, ceramic fibers and basalt fibers, preferable is glass fibers and carbon fibers.

Any known glass fiber is preferably used, and the present invention is not limited in diameter, shape such as cylinder and cocoon, length and glass cutting method such as chopped strand and roving of the glass fiber. Further, the present invention is not limited in type of glass, such as E-glass fiber, D-glass fiber, S-glass fiber, C-glass fiber, T-glass fiber, and E-glass fiber or corrosion-resistant glass containing zirconium is preferably used in the view of quality.

The reinforcing agent, preferably glass fiber is preferably in an amount of 0 wt % to 40 wt %, based on the total weight of the polybutylene terephthalate composition, preferably from 5 wt % to 40 wt %, more preferably from 5 wt % to 35 wt %, most preferably from 5 wt % to 30 wt %.

Additives (F)

The polybutylene terephthalate composition of the present invention may further comprise as component (F) additives generally added in a thermoplastic resin and a thermosetting resin, that is lubricants, stabilizers, antioxidant agents, demolding agents, UV stabilizers, thermal stabilizers, gamma ray stabilizers, antistatic agents, flow aids, flame retardants, elastomer modifiers, acid scavengers, emulsifiers, nucleating agents, plasticizers and/or pigments. These and further suitable additives are described, for example, in Gächter, Müller, Kunststoff-Additive [Plastics Additives], 3rd edition, Hanser-Verlag, Munich, Vienna, 1989 and in the Plastics Additives Handbook, 5th Edition, Hanser-Verlag, Munich, 2001. The additives can be used alone or in a mixture, or in the form of masterbatches.

The additive is preferably used in an amount of 0.01 wt % to 5 wt %, preferably is from 0.1 wt % to 3 wt %, most preferably is from 0.1 wt % to 2 wt %, based on the total weight of the polybutylene terephthalate composition.

In one preferred embodiment of the invention, the polybutylene terephthalate composition according to the invention may further include one or more lubricant and/or processing agent. If included, the lubricant and/or processing agent is preferably an ester or amide of saturated aliphatic carboxylic acids having from 10 to 40 carbon atoms and/or saturated aliphatic alcohols or amines having from 2 to 40 carbon atoms. A preferred lubricant is pentaerythritol tetrastearate, fatty acid ester of pentaerythritol having 10 to 20 carbon atoms.

The lubricant is preferably present in an amount of about 0 wt % to 3 wt %, more preferably of about 0.01 wt % to 2 wt %, and most preferably of about 0.2 wt % to 1 wt %, each based on the total weight of the polybutylene terephthalate composition according to the invention.

In one preferred embodiment of the invention, the polybutylene terephthalate composition according to the invention may further include one or more antioxidant agent. Antioxidant agents used are preferably aromatic amine-based antioxidant agent, hindered phenol-based antioxidant agents and phosphite-based antioxidant agents.

Examples of aromatic amine-based antioxidant agent are poly(1,2-dihydro-2,2,4-trimethyl-quinoline), bis(4-octylphenyl)amine, 4,4'-bis($\alpha,\alpha$-dimethylbenzyl)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, and/or N,N'-bis(methylphenyl)-1,4-benzenediamine.

Examples of hindered phenol-based antioxidant agents are poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester. And preferably the solid hindered phenol-based antioxidant agent is one or more selected from group "B-S" consisted of 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, pentaerythritol tetrakis(3-(3,5-di-tert-butyl-4-hydroxyphenyl) propionate), triethylene glycol-bis[3-(3-tert-butyl-5-methyl-4-hydrophenyl)propionate], 2,4-bis(n-octylthio)-6-(4-hydroxy-3,5-di-tert-butylanilino)-1,3,5-triazine, tris-(3,5-di-tert-butyl-4-hydroxybenzyl)-isocyanurate, 2,2-thiodiethylene bis[3-(3,5-di-tert-butyl-4-hydroxyphenyl) propionate].

Examples of phosphite-based antioxidant agents are tris (2,4-di-tert-butylphenyl) phosphite (Irgafos® 168, BASF SE, CAS 31570-04-4), bis(2,4-di-tert-butylphenyl)pentaerythrityl diphosphite (Ultranox® 626, Chemtura, CAS 26741-53-7), bis(2,6-di-tert-butyl-4-methylphenyl)pentaerythrityl diphosphite (ADK Stab PEP-36, Adeka, CAS 80693-00-1), bis(2,4-dicumylphenyl)pentaerythrityl diphosphite (Doverphos® S-9228, Dover Chemical Corporation, CAS 154862-43-8), tris(nonylphenyl) phosphite (Irgafos® TNPP, BASF SE, CAS 26523-78-4), (2,4,6-tri-t-butylphenol)-2-butyl-2-ethyl-1,3-propanediol phosphite (Ultranox® 641, Chemtura, CAS 161717-32-4) and Hostanox® P-EPQ.

The antioxidant agent is preferably present in an amount of about 0 wt % to 2 wt %, more preferably of about 0.01 wt % to 1 wt %, and most preferably of about 0.2 wt % to 0.8 wt %, each based on the total weight of the polybutylene terephthalate composition according to the invention.

In one preferred embodiment of the invention, the polybutylene terephthalate composition according to the invention may further include one or more adhesive adjuvant.

Examples of adhesive adjuvants are epoxide, such as epoxidized alkyl esters of fatty acid, such as epoxidized linseed oil, epoxidized soybean oil, epoxidized rapeseed oil and epoxy resin such as bisphenol-A resin.

The adhesive adjuvant is preferably present in an amount of about 0 wt % to 3 wt %, more preferably of about 0.01 wt % to 2 wt %, and most preferably of about 1 wt % to 2 wt %, each based on the total weight of the polybutylene terephthalate composition according to the invention.

In one preferred embodiment, the polybutylene terephthalate composition comprising 20 wt % to 50 wt % of component (A) polybutylene terephthalate (PBT) resin, 15 wt % to 35 wt % of component (B) polyester copolymer with melting point from 105° C. to 185° C., 5 wt % to 15 wt % of component (C) vinyl-based polymer, 5 wt % to 15 wt % of component (D) glass bubbles; 5 wt % to 30 wt % of component (E) reinforcing agent, preferable glass fibers; and 0 wt % to 5 wt % of additives (F). The polyester copolymer is preferably constituted from terephthalic acid, ethylene glycol, polyoxyalkylene glycol having 2 to 4 oxyalkylene units of which the carbon atom number is 2 to 4 such as diethylene glycol as the third glycol, and aromatic dicarboxylic acid having from 8 to 16 carbon atoms such as isophthalic acid and/or phthalic acid as the third carboxylic acid. Preferably, the amount of the third glycol is from 1 mol % to 10 mol %, the amount of the third dicarboxylic acid is from 1 mol % to 10 mol %, based on the total moles of the monomers constituting the polyester copolymer, the ratio of dicarboxylic acid (terephthalic acid and the third carboxylic acid) to the glycol (ethylene glycol and the third glycol) is 0.9:1.1 to 1.1:0.9. The vinyl-based polymer is preferably the combination of at least two vinyl-based polymers which are derived from at least one (C-1) and at least one (C-2), the (C-2) of one first vinyl-based polymer is derived from the monomers comprising at least one epoxy compound of the ethylenically unsaturated carboxylic acid, the (C-2) of one second vinyl-based polymer is derived from the monomers comprising at least one acid anhydride of the ethylenically unsaturated carboxylic acid. The (C-1) of the first and second vinyl-based polymers could be the same or different.

The polybutylene terephthalate composition in the present invention can be easily prepared using facilities and processes generally used in a conventional method for preparing a resin composition.

In another aspect, the present invention relates to a process for preparing the polybutylene terephthalate composition according to the invention. The polybutylene terephthalate composition could be prepared or processed by various known methods, such as extruding or kneading. For example, the composition according to the present invention may be prepared or processed by (1) mixing the polybutylene terephthalate resin (A), the polyester copolymer (B), the vinyl-based polymer (C) and optional additives (F), optionally (2) adding the reinforcing agent (E), optionally (3) adding the glass bubbles (D) and extruding or kneading. It is to be understood that the components may be introduced via different hoppers depending on the forms or properties thereof, in case that the components are introduced into the same feeding zone. The temperature of the extruder is the conventional processing temperature of the polybutylene terephthalate composition, preferably is from 200° C. to 270° C. The rational speed of the extruder is the conventional processing speed of the polybutylene terephthalate composition, preferably is from 200 to 500 rpm.

In another aspect, the present invention relates to a use of the polyester copolymer with melting point ($T_m$) from 105° C. to 185° C. in increasing the bonding strength of polybutylene terephthalate resin and metal in a plastic/metal hybrid. The bonding strength is preferably the tensile lap-shear strength tested according to ISO19095.

In another aspect, the present invention also relates to an article obtained or obtainably by the polybutylene terephthalate composition according to the present invention. The articles are preferably used as parts or components in E&E field, especially in high frequency communication field, such as frame, housing or package of mobiles, sensors or laptops, or antenna splitter of mobiles or vehicles.

A composite of plastic/metal hybrid is also disclosed in the present invention, which comprises metal article and the polybutylene terephthalate composition of the present invention which is joined to and integrated with the metal article. The metal is preferable iron, stainless steel, aluminum, or magnesium.

The surface of the metal is covered substantially completely with ultra-fine irregularities which are shaped as an endless succession of steps having a height and length of 50 to 500 nm and a width of several hundred to several thousand nm. The several is the number from 1 to 10.

The surface of the metal is preferably covered by a layer of a metal oxide or metal phosphate.

The composite of plastic/metal hybrid can be easily prepared using facilities and processes generally used in a conventional method of nano-molding technology, such as the methods mentioned in EP 2174766B1, the contents of which are incorporated herein by reference.

The polybutylene terephthalate resin of the present invention has high bonding strength with metal in plastic/metal hybrid, which could be applied in more various fields comparing to known plastic/metal hybrid. The composite of plastic/metal hybrid could be used as parts or components in E&E field, especially in high frequency communication field, such as frame, housing or package of mobiles, sensors or laptops, or antenna splitter of mobiles or vehicles.

In a preferred embodiment of the polybutylene terephthalate composition which comprising at least two vinyl-based polymers, the polybutylene terephthalate composition could maintain a high bonding strength with metal and a low dielectric constant and loss.

Examples

The present invention will be described in more detail with reference to the following examples. The present invention, however, is not limited to these examples.

Details of the components used to evaluate properties are as follows.

The raw materials used in the examples are as follows:
(A) Ultradur® B2550 from BASF, polybutylene terephthalate resin with viscosity number of 107 cm$^3$/g measured in a 0.005 g/ml phenol/1,2-dichlorobenzene solution (1:1 mass ratio) according to ISO1628, number-average molar mass molecular weight (Mn) of 16500 g/mol.
(B) Low melting point polyester: made of terephthalic acid (TPA), isophthalic acid (IPA), ethyl glycol (EG) and diethylene glycol (DEG), molar ratio of TPA:IPA:EG:DEG=1:0.4:1.3:0.1, $T_g$=68° C., $T_m$=174° C., intrinsic viscosity=0.68 dL/g.
(B') PET WK851 from Zhejiang Wankai New Materials Co., Ltd., TPA based polyethylene terephthalate, Tm=243° C.
(C-1) Polyolefin-based polymer: Elvaloy® PTW: ethylene/n-butyl acrylate/glycidyl methacrylate copolymer from Dupont with 58 wt % of ethylene, 36 wt % of n-butyl acrylate, 6 wt % of glycidyl methacrylate.

(C-2) Polyolefin-based polymer: Paraloid™ EXL-2655 MBS: methyl methacrylate-butadiene-styrene (MBS) copolymer from DOW Chemical.
(C-3) Polyolefin-based polymer: Lotader® 3410: random terpolymer of ethylene, butyl acrylate and maleic anhydride from Arkema with 17-20 wt % of butyl acrylate, 3 wt % of maleic anhydride.
(D) Glass bubbles: iM 16K from 3M Company.
(E-1) Glass fiber: ECS3031H from Chongqing Polycomp International Corp.
(E-2) Glass fiber ECS303N-3-K/HL from Chongqing Polycomp International Crop.

Additives:
Vikoflex® 7190: as stabilizer, epoxidized linseed oil from Arkema.
Loxiol® P 861/3.5: long-chain fatty acid ester of pentaerythritol from Emery oleochemicals.
Irganox® 1010: antioxidant from BASF.

The formulations for the examples and comparative examples are shown in the following Table 1-3. The raw materials are mixed together in a high-speed stirrer, fed into a twin-screw extruder (Berstorff ZE25), melt-extruded under a temperature of 260-265° C., pelletized, thus obtaining a polybutylene terephthalate composition in a pellet form. The extruding conditions for the following examples are: the zone temperature of the screw extruder is from 200° C. to 250° C.; the throughput is 30 kg/h. The testing specimens were prepared by injection molding in Arburg 370C, the melting temperature is 260° C. and molding temperature is 80° C.

Characterization:
Tensile modulus, elongation at break, tensile strength at break are measured and characterized according to ISO 527-1/2 at 23° C. by using test specimens of type 1A.
Charpy notched impact strength and Charpy unnotched impact strength was tested according to type A of ISO 179-1-2010 at 23° C., the sample stripe is 80*10*4 mm (length*width*thickness).
MVR: melt volume-flow rate was tested according to ISO1133-2011, the test condition is 2.16 kg load at 275° C.
The dielectric constant and dielectric loss were evaluated according to IEC 60250 under 1 GHz, or GB/T 12636-90.

The tensile lap-shear strength was tested according to ISO19095. The resin part of the test specimen has the size of 10 mm (width)*45 mm (length)*3 mm (thickness), the metal part of the specimen is made of Al 6061 with the size of 18 mm (width)*45 mm (length)*1.6 mm (thickness), the bonding area is 0.5 cm2. The specimen has been annealed at 170° C. for 1 hour before the test.

TABLE 1

| Component by wt. % | Comp. 1 | Exp. 1 | Exp. 2 |
|---|---|---|---|
| Ultradur ® B2550 (A) | 30.4 | 30.4 | 30.4 |
| PET WK-851 (B') | 30.3 | — | — |
| Low melting point polyester (B) | 0 | 30.3 | 30.3 |
| Glass fiber ECS3031H (E-1) | 30 | 30 | 30 |
| Elvaloy ® PTW (C-1) | 7 | 7 | — |
| Paraloid ™ EXL-2655 MBS (C-2) | — | — | 7 |
| Vikoflex ® 7190 | 1.5 | 1.5 | 1.5 |
| Irganox ® 1010 | 0.3 | 0.3 | 0.3 |
| Loxiol ® P861/3.5 | 0.5 | 0.5 | 0.5 |
| Total percentage | 100 | 100 | 100 |
| Bonding Strength Test, MPa | | | |
| Tensile lap-shear strength after annealing | 26 | 37.6 | 34 |
| Dielectric Property Test, IEC 60250, 1 GHz | | | |
| Dielectric Constant | 3.3 | 3.3 | 3.4 |
| Dielectric Loss | 0.012 | 0.011 | 0.009 |
| Tensile Test | | | |
| Tensile modulus, MPa | 8574 | 9730 | 8808 |
| Elongation at break, % | 3.5 | 3.4 | 3.15 |
| Tensile strength at break, MPa | 107 | 118 | 113 |
| Charpy Test, KJ/m$^2$ | | | |
| Charpy, Notched at 23° C. | 13.7 | 13.1 | 10.4 |
| Charpy, Unnotched at 23° C. | 70.9 | 75.3 | 77.4 |
| Melt Flow Test, cc/10 min | | | |
| MVR (275° C., 2.16 kg) | 8.2 | 6 | 14.9 |

TABLE 2

| Component by wt. % | Exp. 3 | Exp. 4 | Exp. 5 | Exp. 6 | Exp. 7 |
|---|---|---|---|---|---|
| Ultradur ® B2550 (A) | 30.4 | 30.35 | 30.35 | 30.35 | 30.35 |
| Low melting point polyester (B) | 30.3 | 30.35 | 30.35 | 30.35 | 30.35 |
| Glass fiber ECS3031H (E-1) | 30 | 25 | 20 | 15 | 10 |
| Glass bubble iM 16K (D) | 0 | 5 | 10 | 15 | 20 |
| Elvaloy ® PTW (C-1) | 7 | 7 | 7 | 7 | 7 |
| Vikoflex ® 7190 | 1.5 | 1.5 | 1.5 | 1.5 | 1.5 |
| Irganox ® 1010 | 0.3 | 0.3 | 0.3 | 0.3 | 0.3 |
| Loxiol ® P861/3.5 | 0.5 | 0.5 | 0.5 | 0.5 | 0.5 |
| Total percentage | 100.00 | 100.00 | 100.00 | 100.00 | 100.00 |
| Dielectric Property Test, 1 GHz | | | | | |
| Dielectric Constant | 3.3 | 3.0 | 2.9 | 2.7 | 2.5 |
| Dielectric Loss | 0.011 | 0.011 | 0.011 | 0.010 | 0.009 |
| Tensile Test | | | | | |
| Tensile modulus, MPa | 9730 | 7874 | 7048 | 5963 | 5290 |
| Elongation at break, % | 3.4 | 3.3 | 2.8 | 3.3 | 3.2 |
| Tensile strength at break, MPa | 118 | 103 | 93 | 78 | 67 |

TABLE 2-continued

| Component by wt. % | Exp. 3 | Exp. 4 | Exp. 5 | Exp. 6 | Exp. 7 |
|---|---|---|---|---|---|
| Charpy Test, KJ/m$^2$ | | | | | |
| Charpy, Notched at 23° C. | 13.1 | 10.9 | 7.1 | 6.5 | 5.4 |
| Charpy, Unnotched at 23° C. | 75.3 | 71.6 | 55.9 | 52.4 | 40.1 |
| Melt Flow Test, cc/10 min | | | | | |
| MVR (275° C., 2.16 kg) | 6.0 | 15.8 | 7.6 | 1.3 | 0 |
| Bonding Strength Test, MPa | | | | | |
| Tensile lap-shear strength after annealing | 37.6 | 27.7 | 23.2 | 18.7 | 16.2 |

TABLE 3

| Component by wt. % | Exp. 8 | Exp. 9 | Exp. 10 | Exp. 11 |
|---|---|---|---|---|
| Ultradur ® B2550 (A) | 25.35 | 25.35 | 30.42 | 30.42 |
| Low melting point polyester (B) | 25.35 | 25.35 | 20.28 | 20.28 |
| Glass fiber ECS3031H (E-1) | 30 | 30 | — | — |
| Glass fiber ECS303(HL)303N-3 (E-2) | — | — | 25 | 25 |
| Glass bubble iM 16K (D) | 10 | 10 | 10 | 10 |
| Elvaloy ® PTW(C-1) | 7 | 4 | 12 | 6 |
| Lotader ® 3410 (C-3) | — | 3 | — | 6 |
| Vikoflex ® 7190 | 1.5 | 1.5 | 1.5 | 1.5 |
| Irganox ® 1010 | 0.3 | 0.3 | 0.3 | 0.3 |
| Loxiol ® P861/3.5 | 0.5 | 0.5 | 0.5 | 0.5 |
| Total percentage | 100.00 | 100.00 | 100.00 | 100.00 |
| Bonding Strength Test, MPa | | | | |
| Tensile lap-shear strength after annealing | 15.8 | 27.3 | 11.7 | 23.3 |
| Dielectric Property Test IEC 60250, 1 GHz | | | | |
| Dielectric Constant | 3.0 | 3.0 | — | — |
| Dielectric Loss | 0.011 | 0.01 | — | — |
| GB/T 12636-90 | | | | |
| Dielectric Constant, 1 GHz | — | — | 2.9 | 2.9 |
| Dielectric Loss, 1 GHz | — | — | 0.01 | 0.009 |
| Dielectric Constant, 2 GHz | — | — | 2.9 | 2.9 |
| Dielectric Loss, 2 GHz | — | — | 0.01 | 0.009 |
| Dielectric Constant, 5 GHz | — | — | 2.8 | 2.8 |
| Dielectric Loss, 5 GHz | — | — | 0.009 | 0.008 |
| Tensile Test | | | | |
| Tensile modulus, MPa | 9828 | 9542 | 6862 | 6394 |
| Elongation at break, % | 3.48 | 3.2 | 3.3 | 2.1 |
| Tensile strength at break, MPa | 107 | 105 | 84 | 68 |
| Charpy Test, KJ/m$^2$ | | | | |
| Charpy, Notched at 23° C. | 10.8 | 11.8 | 12.8 | 8.2 |
| Charpy, Unnotched at 23° C. | 60.4 | 57.2 | 72.8 | 38.7 |
| Melt Flow Test, cc/10 min | | | | |
| MVR(275° C., 2.16 kg) | 1.0 | 0 | 1.9 | 0 |

Seen from Table 1-3, examples 1-11 show better results than the comparative examples.

The invention claimed is:

1. A polybutylene terephthalate composition, comprising as component (A) a polybutylene terephthalate resin, as component (B) a polyester copolymer with a melting point from 105° C. to 185° C., as component (C) a vinyl-based polymer, and optionally as component (D) glass bubbles,
    wherein the polyester copolymer (B) is derived from terephthalic acid, ethylene glycol, and the copolymerizable monomers polyoxyalkylene glycol having 2 to 4 oxyalkylene units of which the carbon atom number is 2 to 4, and an aromatic dicarboxylic acid different from terephthalic acid and having from 8 to 16 carbon atoms, and
    wherein the polyester (B) is comprised in an amount of from 15 wt % to 35 wt % based on the total weight of the polybutylene terephthalate composition.

2. The polybutylene terephthalate composition according to claim 1, wherein a content of the polybutylene terephthalate resin (A) is from 20 wt % to 80 wt %; a content of the vinyl-based polymer (C) is from 0.1 wt % to 20 wt %; and a content of the glass bubbles (D) is from 0 to 30 wt %, based on a total weight of the polybutylene terephthalate composition.

3. The polybutylene terephthalate composition according to claim 1, wherein in the polyester copolymer (B)
the aromatic dicarboxylic acid different from terephthalic acid is selected from the group consisting of isophthalic acid, phthalic acid, 2,6-naphthalenedicarboxylic acid, 1,4-naphthalenedicarboxylic acid, 2,7-naphthalenedicarboxylic acid, 4,4'-diphenylmethanedicarboxylic acid, 4,4'-diphenylketone dicarboxylic acid, 4,4'-diphenyldicarboxylic acid, 4,4'-diphenoxy ether dicarboxylic acid, and 4,4'-diphenyl ether dicarboxylic acid;
the polyoxyalkylene glycol is selected from the group consisting of diethylene glycol, dipropylene glycol, ditetramethylene glycol, triethylene glycol, tripropylene glycol, and polytetramethylene glycol.

4. The polybutylene terephthalate composition according to claim 1, wherein the polyester copolymer comprises 5% to 30% by mole of copolymerizable monomers, based on a total moles of monomers constituting the polyester copolymer.

5. The polybutylene terephthalate composition according to claim 1, wherein the component (C) vinyl-based polymer is derived from (C-1) at least one vinyl monomer, and (C-2) at least one ethylenically unsaturated carboxylic acid and/or a derivative thereof;
wherein the derivative of the ethylenically unsaturated carboxylic acid is selected from the group consisting of epoxy compound, ester, amide, imide, acid anhydride and metal salt of the ethylenically unsaturated carboxylic acid.

6. The polybutylene terephthalate composition according to claim 5, wherein the vinyl monomer (C-1) is in an amount of from 40 wt % to 90 wt %, and the ethylenically unsaturated carboxylic acid and/or a derivative thereof (C-2) is in an amount of from 10 wt % to 60 wt %, based on a total weight of monomers constituting the vinyl-based polymer.

7. The polybutylene terephthalate composition according to claim 5, wherein the vinyl monomer (C-1) is an alpha-olefin and/or a diene;
wherein the alpha-olefin has from 2 to 20 carbon atoms; and the diene is a conjugated diene.

8. The polybutylene terephthalate composition according to claim 7, wherein the alpha-olefin is present and is selected from the group consisting of ethylene, propylene, 1-butylene, isobutene, 1-pentene, 1-hexene, 1-octene, 4-methyl-1-pentene, 3-methyl-1-pentene, 3,5,5-trimethyl-1-hexene, 1-decene and mixtures thereof.

9. The polybutylene terephthalate composition according to claim 1, wherein the component (C) is a combination of at least two vinyl-based polymers which are derived from at least one (C-1) and at least one (C-2),
wherein the (C-2) of a first vinyl-based polymer is derived from monomers comprising at least one epoxy compound of an ethylenically unsaturated carboxylic acid, and the (C-2) of a second vinyl-based polymer is derived from monomers comprising at least one acid anhydride of the ethylenically unsaturated carboxylic acid.

10. The polybutylene terephthalate composition according to claim 9, wherein the epoxy compound of the ethylenically unsaturated carboxylic acid in the first vinyl-based polymer is in an amount of from 1 wt % to 10 wt %, based on a total weight of monomers constituting the first vinyl-based polymer; and the acid anhydride of the ethylenically unsaturated carboxylic acid in the second vinyl-based polymer is in an amount of from 1 wt % to 10 wt %, based on a total weight of monomers constituting the second vinyl-based polymer.

11. The polybutylene terephthalate composition according to claim 1, wherein an ethylenically unsaturated carboxylic acid of the component (C) is selected from the group consisting of acrylic acid, methacrylic acid, maleic acid, fumaric acid, glutaconic acid, itaconic acid, citraconic acid, 2-ethylacrylic acid, 2-chloroacrylic acid, crotonic acid, isocrotonic acid, angelic acid, sorbic acid, mesaconic acid, cinnamic acid, p-chloro cinnamic acid, 3,4,5,6-tetrahydrophthalic acid, 1,2,3,6-tetrahydrophthalic acid, bicyclo (2.2.2)-octa-5-ene-2,3-dicarboxylic acid, 4-methylcyclohexa-4-ene-1,2-dicarboxylic acid, 1,2,3,4,5,8,9,10-octahydronaphthalene-2, 3-dicarboxylic acid, bicyclo (2.2.1) octa-7-ene-2,3,5,6-tetracarboxylic acid, maleopimaric acid, and 7-oxabicyclo (2.2.1) hepta-5-ene-2,3-dicarboxylic acid;
an acid anhydride of the ethylenically unsaturated carboxylic acid of the component (C) is selected from the group consisting of maleic anhydride, acrylic anhydride, methacrylic anhydride, 4-methyl cyclohex-4-ene-1,2-dicarboxylic acid anhydride, itaconic anhydride, citraconic anhydride, fumaric anhydride, 3,4,5,6-tetrahydrophthalic anhydride, 1,2,3,6-tetrahydrophthalic anhydride, bicyclo(2.2.2)oct-5-ene-2,3-dicarboxylic acid anhydride, 1,2,3,4,5,8,9,10-octahydronaphthalene-2,3-dicarboxylic acid anhydride, bicyclo(2.2.1)hept-5-ene-2,3-dicarboxylic acid anhydride, tnorborn-5-ene-2,3-dicarboxylic acid anhydride, nadic anhydride, methyl nadic anhydride, himic anhydride, methyl himic anhydride and x-methylbicyclo(2.2.1)hept-5-ene-2,3-dicarboxylic acid anhydride;
an ester of the ethylenically unsaturated carboxylic acid of the component (C) is selected from the group consisting of methyl methacrylate, methyl acrylate, ethyl methacrylate, ethyl acrylate, propyl acrylate, propyl methacrylate, butyl acrylate, butyl methacrylate, isobutyl acrylate, isobutyl methacrylate, 2-ethylhexyl acrylate, octyl acrylate, octyl methacrylate, decyl acrylate, decyl methacrylate, isodecyl acrylate, isodecyl methacrylate, lauryl acrylate, lauryl methacrylate, dimethyl maleate, monomethyl maleate, hydroxyethyl methacrylate (HEMA), stearyl methacrylate, stearyl acrylate, isobornyl acrylate, isobornyl methacrylate, hydroxypropyl methacrylate, and vinyl acetate;
an epoxy compound of the ethylenically unsaturated carboxylic acid of the component (C) is selected from the group consisting of glycidyl acrylate, glycidyl methacrylate, maleic acid 1-glycidyl ester, diglycidyl ester of maleic acid, monoglycidyl ester of itaconic acid, diglycidyl ester of itaconic acid, monoglycidyl ester of citraconic acid, diglycidyl ester of citraconic acid, monoglycidyl ester of butenetricarboxylic acid, diglycidyl ester of butenetricarboxylic acid, triglycidyl ester of butenetricarboxylic acid, vinyl glycidyl ether, allyl glycidyl ether, 2-methylallyl glycidyl ether, phenyl glycidyl ether, and 4-vinylbenzyl glycidyl ether;
an amide of the ethylenically unsaturated carboxylic acid of the component (C) is selected from the group consisting of allylamine, aminoethyl methacrylate, aminopropyl methacrylate, dimethyaminoethyl methacrylate, acrylamide, methacrylamide, maleic acid monoamide, maleic acid diamide, maleic acid N-monoethylamide, maleic acid N,N-diethylamide, fumaric acid monoamide, and fumaric acid diamide;
an imide of the ethylenically unsaturated carboxylic acid of the component (C) is selected from the group consisting of maleimide, N-butylmaleimide, N-phenylmaleimide and N-cyclohexylmaleimide; and a melt salt of the ethylenically unsaturated carboxylic acid of the component (C) is selected from the group consisting of sodium acrylate, calcium acrylate, sodium methacrylate and calcium methacrylate.

12. The polybutylene terephthalate composition according to claim 1, wherein the component (C) is a combination of a first and a second vinyl-based polymer;
wherein the first vinyl-based polymer is ethylene/methyl (meth)acrylate/glycidyl methacrylate copolymer, ethylene/(meth)acrylate/glycidyl methacrylate copolymer, ethylene/ethyl (meth)acrylate/glycidyl methacrylate copolymer or ethylene/butyl (meth)acrylate/glycidyl methacrylate copolymer; and the second vinyl-based polymer is ethylene/methyl (meth)acrylate/maleic anhydride copolymer, ethylene/(meth)acrylate/glycidyl methacrylate copolymer, ethylene/ethyl (meth)acrylate/glycidyl methacrylate copolymer, or ethylene/butyl (meth)acrylate/glycidyl methacrylate copolymer.

13. The polybutylene terephthalate composition according to claim 1, wherein the glass bubbles are present and have a median diameter D50 by volume from 5 to 50 microns; an average true density of the glass bubbles is 0.3-0.7 g/cc which is measured according to ASTM D2840-69; and a crush strength of the glass bubbles is 5,000 PSI to 30,000 PSI measured according to ASTM D3102-72.

14. The polybutylene terephthalate composition according to claim 1, wherein the polybutylene terephthalate composition further comprises 0 to 40 wt % of as component (E) a reinforcing agent and/or 0 to 5 wt % of as component (F) additives.

15. A process for preparing the polybutylene terephthalate composition according to claim 1, comprising (1) mixing the polybutylene terephthalate resin (A), the polyester copolymer (B), the vinyl-based polymer (C), and optional additives (F), optionally (2) adding a reinforcing agent (E), optionally (3) adding the glass bubbles (D), and extruding or kneading.

16. An article, comprising:
the polybutylene terephthalate composition according to claim 1, wherein the article is used as parts or components of a frame, housing or package of mobiles, sensors or laptops, or an antenna splitter of mobiles or vehicles.

17. A composite of plastic/metal hybrid, comprising:
a metal article and the polybutylene terephthalate composition according to claim 1, which is joined to and integrated with the metal article.

18. The polybutylene terephthalate composition according to claim 1, wherein a content of the polybutylene terephthalate resin (A) is from 20 wt % to 50 wt %; a content of the vinyl-based polymer (C) is from 5 wt % to 20 wt %; and a content of the glass bubbles (D) is from 5 to 10 wt %, based on a total weight of the polybutylene terephthalate composition.

19. The polybutylene terephthalate composition according to claim 1, wherein the aromatic dicarboxylic acid different from terephthalic acid is phthalic acid.

20. The polybutylene terephthalate composition according to claim 1, wherein the polyester copolymer (B) is made of terephthalic acid, isophthalic acid, ethyl glycol, and diethylene glycol.

* * * * *